Figure 1:
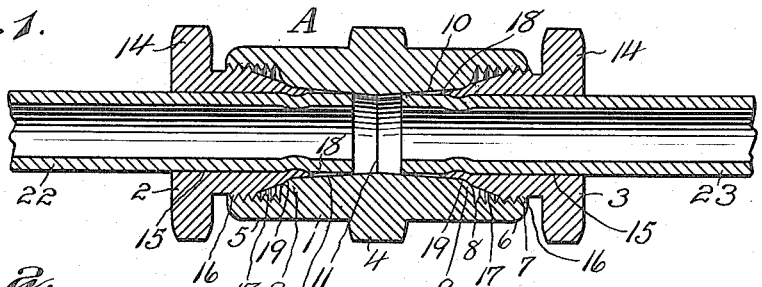

C. H. DUFFY.
COMPRESSION COUPLING.
APPLICATION FILED NOV. 15, 1911.

1,143,816.                                    Patented June 22, 1915.

Witnesses
J. P. Britt
E. C. Duffy

Inventor
Charles Hugh Duffy
By

UNITED STATES PATENT OFFICE.

CHARLES HUGH DUFFY, OF LAUREL, MARYLAND, ASSIGNOR TO FREDERICK H. TWEED, OF CHICAGO, ILLINOIS.

COMPRESSION-COUPLING.

1,143,816.  Specification of Letters Patent.  Patented June 22, 1915.

Application filed November 15, 1911. Serial No. 660,460.

*To all whom it may concern:*

Be it known that I, CHARLES HUGH DUFFY, a citizen of the United States, residing at Laurel, in the county of Howard and State of Maryland, have invented certain new and useful Improvements in Compression-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the class of pipe couplings, but more particularly to a compression coupling to be primarily used in connection with brass and copper tubing and the like to couple two tube sections together or to couple a tube section to an element such as a tank or the like.

The invention is therefore particularly adapted for use in gasolene feeds from tanks to internal combustion engines and in lubricating systems therefor as will hereinafter more fully appear.

The invention has for its object to provide a solderless coupling for tubing, pipe and the like wherein the tubing, pipe or the like is engaged and gripped by the coupling at two separate and distinct points in such manner that the tubing, pipe or the like is rigidly held against wabbling, and is thereby less liable to become loosened by shocks, strains or vibrations.

The invention has for its object to provide a solderless coupling for tubing and the like which embodies extreme simplicity, strength and rigidity and which comprises no tapered compression collar or other packing or coupling element independent of and separate from the primary coupling members.

A further object of the invention is to provide a simple and efficient coupling for tubes and the like which will effectually couple or connect tube sections without threading or soldering the same and which requires no packing ring or other expedient in order to effect a gas-tight union between the coupled tube sections or between a tube section and another element.

A further object of the invention is to provide a coupling of the character indicated in which a more effective union between the tube and the coupling members is obtained than is usual with this class of devices in such manner that an absolutely gas-tight connection is quickly and readily accomplished and effectively maintained, and which when in coupled position is locked or jammed and therefore less liable to become loose under strains, shocks or from vibration.

A further object of the invention is to provide a coupling of the character indicated in which a ground union is effected between the coupling members to better produce a gas-tight juncture, and in which a ground union is effected between the coupling and the tube.

With these and other obvious objects in view the invention consists in the novel construction of the coupling members and particularly in the tapered construction of the rotatable male coupling member which coacts with the relatively non-rotating female member in such manner that the taper on the said male member becomes distorted and tightly encompasses or embraces the coupled element or compresses and contracts the same to such an extent that the said distorted taper is forced beyond the regular surface of tube or coupled element, thus forming an annular depression or groove in the said tube or coupled element to effect the coupling action.

The invention further consists in the construction which provides for engaging and gripping the tubing, pipe and the like at two separate and distinct points within the coupling in order to rigidly hold the tubing, pipe or the like against wabbling movement.

The invention further consists in the construction which provides for rotating the tapered portion of the male coupling member relatively to the female coupling member and for engaging the same in such manner that a ground union is effected between the said tapered portion and the said female coupling member; and the invention also consists in the construction which provides for rotating the tapered portion of the male coupling member relatively to the tube or other coupled element and for engaging the same in such manner that a ground union is effected between the said tapered portion and the tube or other coupled element.

The invention further consists in certain other novel details of construction and in certain combinations of parts, all of which will be first fully described and afterward specifically pointed out in the appended claims.

Figure 2:
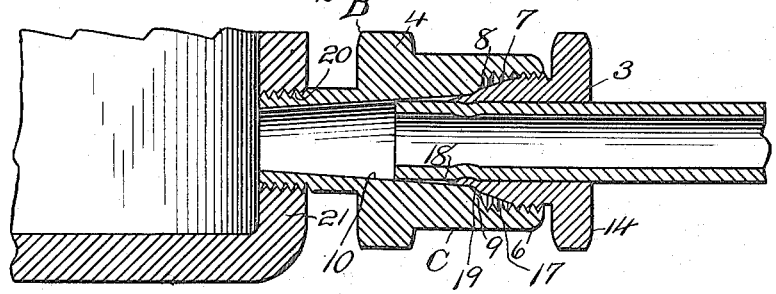
Figure 3:
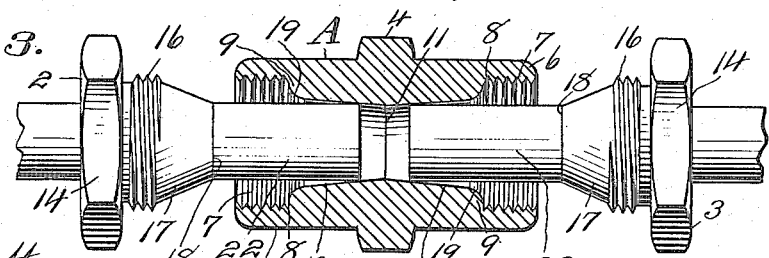
Figure 4:
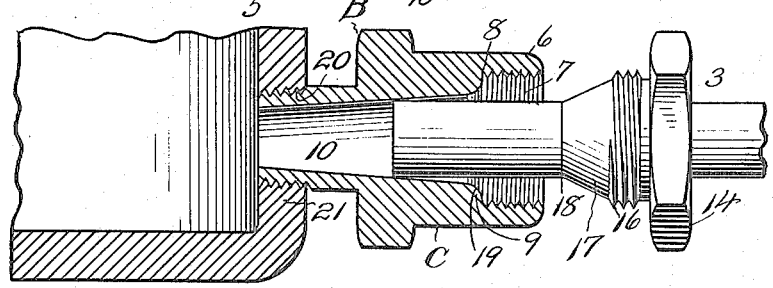
Figure 5:
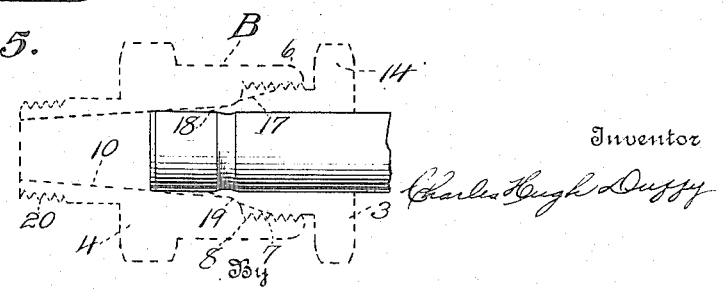

Referring to the accompanying drawings which form a part of this specification: Figure 1 is a longitudinal sectional view through a coupling constructed in accordance with this invention for coupling together two tube sections or the like and illustrating the tube sections in coupled position. Fig. 2 is a longitudinal sectional view through a coupling constructed in accordance with this invention for coupling a tube or the like to an element such as a tank or the like and illustrating a tube section coupled to a tank. Fig. 3 is a longitudinal sectional view through the coupling as illustrated in Fig. 1, and showing the coupling members in disconnected position. Fig. 4 is a similar view of the coupling members which comprise the coupling illustrated in Fig. 2, and Fig. 5 is a phantom view of the coupling showing a tube or pipe in position therein and illustrating the engaging and gripping action of the coupling at two separate and distinct points of the tube or pipe.

Like numerals of reference indicate the same parts throughout the several figures in which:

A indicates the coupling illustrated in Figs. 1 and 3, and B indicates the coupling as illustrated in Figs. 2 and 4, it being of course understood that these views illustrate different forms of the same coupling and not modifications, while it will also be apparent to those skilled in the art that still other forms of the same coupling can be employed for different purposes, the subject matter of this invention as will be hereinafter described remaining the same in all instances.

As will appear from Figs. 1 and 3 the coupling A comprises three primary coupling members 1, 2 and 3, the double female member 1 being provided with a central hexagonal portion 4 to receive a wrench, while the extremities 5 and 6 are preferably round and smooth and reduced for the sake of economy in material. Each end of the member 1 is internally threaded at 7, the threads terminating at 8 at which point an annular shoulder 9 is provided. The bore 10 in each portion of the member 1 extends from the shoulder 9 to the point 11, said bore being tapered as shown, the internal diameter of the member 1 at the point 11 being no less than the internal diameter of the tube or pipe upon which the coupling is applied so as not to reduce the pipe or tube capacity by reason of the application of the coupling thereto, but must essentially be less than the external diameter of the tube or pipe, for a purpose which will hereinafter be fully described. The two male primary members 2 and 3 of the coupling are identical in form and are provided on their outer extremities with a hexagonal portion 14 to receive wrenches and are each provided centrally with a smooth bore 15 equal in diameter to the external diameter of the tube or pipe to be coupled in such manner that a close but slidable fit is effected between the coupling members 2 and 3 and the tube or pipe to be coupled as is clearly shown in Figs. 1 and 3. The central external portion of the coupling members 2 and 3 are threaded at 16 to agree with the threaded portions 7 of the primary coupling member 1, and the inner extremity of each of the coupling members 2 and 3 is provided with a long gradual taper 17, which taper is carried to a feather edge 18, which feather edge of the taper enters within the rounded corner 19 of the shoulder 9, and enters the tapered bore 10 as is clearly shown in Figs. 1 and 3.

Referring now to Figs. 2 and 4, which illustrate the type of this coupling employed for connecting a tube or the like to an element such as a tank or the like, it will be seen that only two coupling members are employed, the female coupling member being indicated by the letter C and the male coupling member being indicated by the numeral 3, this coupling member 3 being identical with the coupling members 2 and 3 just described with reference to Figs. 1 and 3. It will therefore be unnecessary for a proper understanding of this construction to again describe the coupling member 3, and the only variation in the construction of the coupling member C from that shown in Fig. 1 is that one end of the said member C is externally threaded with preferably a standard pipe thread 20 to enter a threaded element such as a tank or the like in order to effect a tight connection between the coupling and the said tank or other element as is clearly shown in Figs. 2 and 4, the wall of a tank being shown in Figs. 2 and 4 and indicated by the numeral 21.

In Fig. 1 the two tube sections 22 and 23 are illustrated in a coupled position, while in Fig. 2 a single tube section is illustrated as coupled to a tank or the like. In the operation of this coupling both tubes to be coupled are placed in position within the coupling member 1 as shown in Figs. 3 and 4, said tubes entering the tapered bores 10 until the ends of the tube or pipe engage the tapered walls of the bores 10 and are thereby stopped. The coupling members 2 and 3 are passed over the pipe sections as shown in Figs. 3 and 4 and are threaded into the coupling members 1 and C until they assume the positions shown in Figs. 1 and 2. The extreme edge of the tapered portion 17 of the coupling members 2 and 3 entering within the rounded shoulder 9 of the coupling member 1 further rotation of the coupling members 2 and 3 forces the said tapered portions 17 within the bores 10 of the coupling member 1. As the annular shoulder 9 is rigid and cannot give to the progression of the tapered portions 17 of the coupling members 2 and 3 the said tapered portions of the said coupling members must necessarily be forced out of their normal form and distorted as shown in Figs. 1 and 2. This distortion of the tapered portions 17 causes the same to tightly embrace and compress the outer surface of the tube sections or other coupled elements and if necessary to such an extent that the said tapered portions will pass beyond the regular periphery of the tube sections or other coupled element forming an annular groove in said tube sections or the like as clearly shown in Figs. 1 and 2. The coupling member 1 being stationary relative to the coupling members 2 and 3 and the tapered portions 17 of said coupling members 2 and 3 rotating against the rounded shoulders 9 of the coupling member 1 a smooth ground bearing or union is effected between the said tapered portions 17 and the rounded shoulders 9 in such manner that an absolutely gas-tight union is effected at this point, while at the same time the tapered portions 17 of the coupling members 2 and 3 rotate relatively to the tube sections or the like to be coupled, and as the said tapered portions are forced into engagement with the said tube sections or the like, and as the said tapered portions enter the said tube sections or the like, a smooth ground union is effected between the said tapered portions and the said tube sections which is occasioned by reason of the rotation of the tapered portions on the outer surfaces or peripheries of the tubes to be coupled together. By reason of this construction an absolutely gas-tight union is effected between the tapered portions and the outer surfaces or peripheries of the tubes or the like to such an extent that after the device is in coupled position as shown in Figs. 1 and 2 a rotation of the tube or tubes will not cause a leakage in the coupling which on the other hand would be liable to occur were it not for the fact that practically a ground connection is effected between the tapers and the tubes. The extreme ends of the tubes or pipes being engaged by the tapered bores 10 the inward progression of the tapered portions 17 of the coupling members 2 and 3 carries with them, or tends to carry with them, the tubes or pipes in such manner that the extreme ends of the tubes or pipes are forced or jammed within the tapered bores 10 to such an extent that the said extreme ends of the tubes or pipes are tightly gripped and wedged within the tapered bores 10 and at the same time the said tubes or pipes are gripped and compressed by the tapered portions 17 of the coupling members 2 and 3. It will thus be plainly seen that the tubes or pipes are engaged and gripped at two separate and distinct points which absolutely and effectively holds them against any wabbling movement and causes them to lock up in the coupling in a strong and rigid manner. It will further be seen that inasmuch as the tapers are integral with the coupling members 2 and 3 the tubes become extremely rigid when in a coupled position, and by reason of the long bore 15 in the coupling members 2 and 3 the tubes or other coupled members are provided with a long rigid bearing which precludes the possibility of an accidental loosening of the parts. It will further be noted that as the tapers 17 engage the rounded shoulders 9 and as the tapers are distorted by the said rounded shoulders a jamming action is effected which jams or locks the coupling members together to such an extent that it is difficult to cause an accidental loosening of the parts by shock or by vibration. It will be further apparent that as the extreme end of the tube or other coupled element enters the tapered bore 10 of the coupling and is jammed in said taper that a gas-tight union is effected at the extreme end of the tube or pipe which together with the gas-tight union formed by the distortion of the tapered portion 17 of the coupling, greatly and to a large degree increases the tightness of the coupling on the tube or pipe and lessens the liability to leakage.

Having thus fully described the invention what is claimed as new and is desired to be secured by Letters Patent of the United States is:—

1. In a readily detachable coupling, a relatively stationary female member centrally bored to receive an element to be coupled, said bore providing a threaded portion, a tapered portion and a shoulder intermediate of said portions, a rotatable male member centrally bored to receive the element to be coupled and comprising a threaded portion and a readily distortable end portion, said rotatable male member being adapted to enter said female member, the said readily distortable end portion of said rotatable male member being adapted to engage and rotate on said shoulder in said female member to grind a gas tight union therebetween and to simultaneously be distorted by said shoulder and forced into intimate contact with the element to be coupled and to simultaneously grind a gas tight union therebetween, the said tapered portion in the bore of the stationary female member being adapted to receive the inner end of the element to be coupled, the said readily distortable portion of the rotatable male member upon its inward progression jamming the said inner end of the element to be coupled within the said taper in the bore of the stationary female member to form a tight union between the inner end of the element to be coupled and the said tapered portion in the bore of the stationary female member in such manner that the element to be coupled is engaged and gripped at two points within the coupling.

2. In a readily detachable coupling, a relatively stationary female member having an internal threaded portion, an internal tapered portion and an internal shoulder intermediate the two portions, the said internal tapered portion being adapted to receive the inner end of an element to be coupled and to limit the entrance thereof, a rotatable male member centrally bored to receive the element to be coupled and externally threaded for threaded engagement with said stationary female member and provided with a readily distortable end portion adapted to engage and rotate on said shoulder within said female portion to grind a gas tight union therebetween and to be distorted and forced by said shoulder into intimate contact with the element to be coupled, to simultaneously grind a gas tight union therebetween and upon inward progression of said readily distortable portion to jam the end of the element to be coupled into the said internal tapered portion in the stationary female member to effect a tight union therebetween in such manner that the element to be coupled is engaged and gripped at two points within the coupling.

3. In a readily separable coupling, a relatively stationary female member, means therein to engage and grip the end of an element to be coupled, an internally threaded portion and an internal annular shoulder, a rotatable male member bored to receive the element to be coupled and threaded for engagement with the said stationary female member, a readily distortable portion on said rotatable male member adapted upon inward progression thereof to engage and rotate on said internal annular shoulder to grind a gas tight joint therebetween; to be distorted by said shoulder into intimate contact with the element to be coupled and to jam the inner end of the element to be coupled into the said means within the female member for engaging and gripping the end of the element to be coupled in such manner that the element to be coupled is rigidly held at two points within the coupling.

4. In a readily separable coupling, a relatively stationary female member, means therein to receive and grip the end of an element to be coupled, a rotatable male member, said members being threaded for connection together, a readily distortable portion on said rotatable male member, means within said stationary female member for distorting said distortable portion on said rotatable male member upon rotation and inward progression thereof to cause said distortable portion to engage and grip the element to be coupled and to cause an inward movement of the element to be coupled thereby forcing the element to be coupled into intimate engagement with the said means within the said female member for receiving and gripping the end of the element to be coupled, the whole arranged in such manner that the element to be coupled is rigidly held at two points within the coupling.

In testimony whereof, I affix my signature, in presence of two witnesses.

CHARLES HUGH DUFFY.

Witnesses:
HARRY A. HEGARTY,
W. D. SENAHAN.